United States Patent [19]

Dougherty et al.

[11] Patent Number: 5,552,642
[45] Date of Patent: Sep. 3, 1996

[54] PROTECTION SYSTEM WITH VOLTAGE SWITCHING

[75] Inventors: Thomas J. Dougherty, Waukesha; Debra L. Smith, West Allis; Ann L. Roche, Glendale; David A. Thuerk, Brookfield; David J. Novak, Elm Grove, all of Wis.

[73] Assignee: Globe-Union, Inc., Milwaukee, Wis.

[21] Appl. No.: 209,086

[22] Filed: Mar. 9, 1994

[51] Int. Cl.$^6$ .................................................. B60R 25/04
[52] U.S. Cl. ............... 307/10.300; 180/287; 340/825.32; 340/825.72; 429/150
[58] Field of Search .................... 307/10.1–10.7; 180/287; 340/825.31, 825.32, 825.34, 825.69, 825.72, 426; 429/150, 153, 154, 158; 320/18

[56] References Cited

U.S. PATENT DOCUMENTS

| | | | |
|---|---|---|---|
| 3,703,589 | 11/1972 | Rigsby, Jr. ............................... | 429/169 |
| 4,110,734 | 8/1978 | Lepore et al. ........................... | 307/10.3 |
| 4,553,127 | 11/1985 | Issa .......................................... | 307/10.3 |
| 4,733,638 | 3/1988 | Anderson ................................. | 180/287 |
| 4,958,084 | 9/1990 | Carlo ....................................... | 307/10.2 |
| 4,965,460 | 10/1990 | Tanaka et al. .......................... | 307/10.2 |
| 5,002,840 | 2/1991 | Klebenow et al. ..................... | 429/150 |
| 5,023,591 | 6/1991 | Edwards .................................. | 429/150 |
| 5,162,164 | 11/1992 | Dougherty et al. ..................... | 429/150 |
| 5,200,877 | 4/1993 | Betton .................................... | 307/10.7 |
| 5,204,610 | 4/1993 | Pierson et al. .......................... | 320/18 |
| 5,256,502 | 10/1993 | Kump ...................................... | 429/150 |

*Primary Examiner*—William M. Shoop, Jr.
*Assistant Examiner*—Richard T. Elms
*Attorney, Agent, or Firm*—Harness, Dickey & Pierce, P.L.C.

[57] ABSTRACT

A protection system for motor vehicles includes a control circuit including a switching device which is connected between cells of the battery and operable between a first condition in which the voltage provided at the battery terminals insufficient to start the vehicle and a second condition in which the voltage provided at the battery terminals sufficient to start the vehicle, the switching device being operated between the first and second conditions by a control signal that is generated by a portable signal transmitting device which is remotely actuatable.

12 Claims, 3 Drawing Sheets

PROTECTION SYSTEM WITH VOLTAGE SWITCHING

BACKGROUND OF THE INVENTION

This invention relates to arrangements for preventing the theft of motor vehicles, and more particularly, to a protection system for preventing a motor vehicles from being started by an unauthorized person.

Various systems have been devised to prevent the theft of motor vehicles. The most commonly used systems cause an audible and/or visual alarm to be generated if an unauthorized person attempts to enter or tamper with a protected vehicle. Although audible and visual alarms may act as a deterrent to the theft of a vehicle, they do not prevent theft of the vehicle. Moreover, generally alarm systems of this type are subject to compromise.

Other types of vehicle anti-theft systems that have been proposed temporarily disable the vehicle on which they are installed. Such systems may be incorporated into the vehicle ignition and starter circuit, connected into the vehicle braking system, or connected into the fuel line system, for example. Although such systems are more difficult to compromise than alarm type systems, they are expensive to install because of the requirement that they be incorporated into an operating system of the vehicle. Moreover, these systems generally require some modification of operating systems of the vehicle.

In U.S. Pat. No. 4,958,084 issued to Louis D. Carlo et al., there is disclosed an anti-theft device adapted to be connected to a battery of a motor vehicle and including a power switch for disconnecting the battery from its standard battery cable when current flowing through the cable exceeds a preselected current that is associated with an attempt to start the vehicle. A override circuit is effective to override the operation of the power switch to permit the vehicle to be started.

SUMMARY OF THE INVENTION

The present invention provides a protection system for a vehicle which prevents the engine of the vehicle from being started by unauthorized persons. The system includes a battery assembly which is adapted to provide a voltage at a theft prevention voltage level which is sufficient to operate accessories of the vehicle, such as the lights, electronic devices such as the vehicle computer, but insufficient to start the engine of the vehicle to a starting voltage level which is sufficient to start the engine of the vehicle. The battery assembly is adapted to be connected to the electrical starter of the vehicle, and includes switching means responsive to a control signal for increasing the voltage applied to the electrical starter from the theft prevention voltage level to the level required for starting the engine of the vehicle.

In accordance with one embodiment, the switching means normally connects a first battery portion between the battery positive and negative terminals and a control means responds to the control signal to connect a second battery portion of the battery assembly in series with the first battery portion of the battery assembly. The control means comprises a signal transmitting device which is remotely actuatable. The transmitting device is a small portable unit which is adapted to be carried by an operator of the vehicle or attached to a key chain, for example.

In accordance with a further embodiment, the switching means comprises a controllable switching device and a control means that responds to control signals provided by the signal transmitting device to provide a drive signal for the controllable switching device that has a first duty cycle for causing the battery voltage provided to be at the theft prevention level and a second, greater duty cycle for causing the battery voltage provided to be at the starting voltage level.

Preferably, the protection system is enclosed within the housing of the battery. Because the battery is locked within the engine compartment of the vehicle, the protection system is hidden from view within the battery and is unaccessible. Moreover, the fact that the vehicle is equipped with the protection system provided by the present invention is virtually impossible to detect without first attempting to start the vehicle. Because the voltage available at the battery terminals normally is less than that required to start the engine of the vehicle, the cranking power provided by the battery will be insufficient to start the engine of the vehicle, so that the vehicle cannot be driven. Thus, the protection system provided by the present invention is substantially immune to compromise.

The invention consists of certain novel features and structural details hereinafter fully described, illustrated in the accompanying drawings, and particularly pointed out in the appended claims, it being understood that various changes in the details may be made without departing from the spirit, or sacrificing any of the advantages of the present invention.

DESCRIPTION OF THE DRAWINGS

FIG. 9 is a perspective view of an intercell terminal connector of the battery assembly.

DESCRIPTION OF PREFERRED EMBODIMENTS

Figure 1:
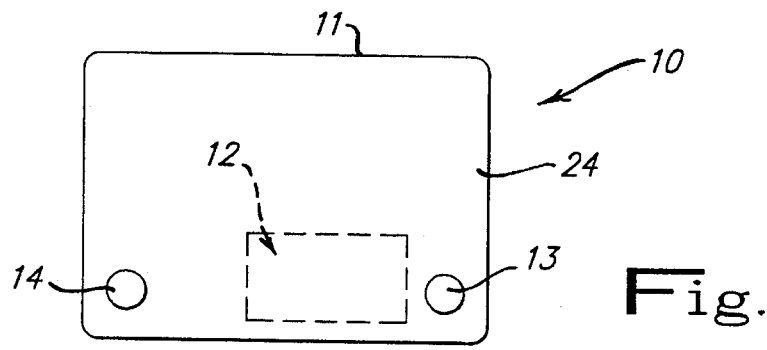
FIG. 1 is top plan view of the vehicle battery assembly provided by the present invention
Figure 4:
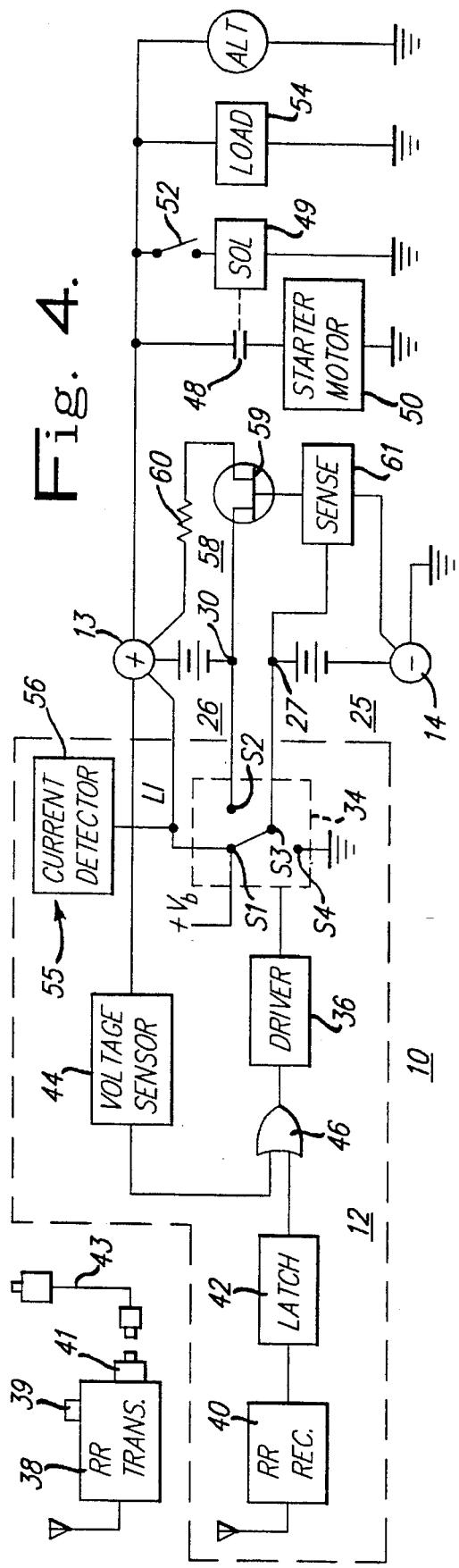
FIG. 4 is a block diagram of the protection system provided by the present invention.

Referring to FIG. 1 of the drawings, the protection system 10 provided by the present invention includes a battery 11 and a switching circuit 12, shown schematically in FIG. 4, which is contained within the cover 24 of the battery 11. The switching circuit 12 is operable to switch the voltage provided at the positive and negative battery terminals 13 and 14 between a theft prevention voltage level which is sufficient to operate accessories of the vehicle but insufficient to start the engine of the vehicle and a starting voltage level which is sufficient to start the engine.

The battery 11 is conventional to the extent that it includes a plurality of cells each contained within a separate compartment of the battery housing and each formed from a plurality of plates containing positive and negative material. The positive and negative plates are alternately arranged within the cell with the positive plates of the cell interconnected by conductive straps and the negative plates of the cell interconnected by conductive straps as is known in the art. In a preferred embodiment, the battery 11 has six cells with each cell delivering a voltaic potential of approximately two volts.

In a conventional battery, the six cells would be connected in series between the positive battery terminal 13 and the negative battery terminal 14 so that the voltage provided by the six-cell battery would be 12 volts. However, in accordance with the present invention, the switching circuit 12 is connected in circuit with the battery cells so that in the theft prevention mode, the battery 11 provides a voltage less than 12 volts. In the exemplary embodiment, the battery voltage provided when the battery is configured in the theft prevention mode is 8 volts. The battery 11 provides the full 12 volts only when the switching circuit 12 is operated to switch the battery voltage from the relatively low theft protection voltage level to the higher starting voltage level. In accordance with a feature of the invention, the switching circuit is operated to switch the battery voltage in response to a control signal generated by a hand-held transmitter operated by a person who is authorized to drive the vehicle.

Figure 2:
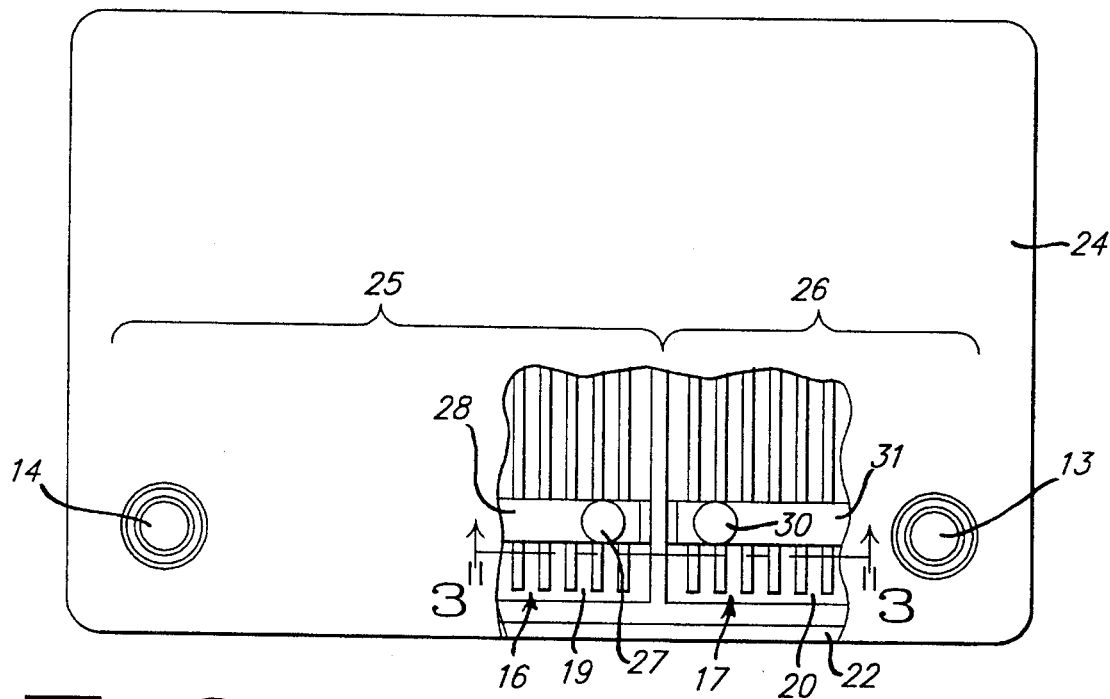
FIG. 2 is top plan view of the battery of the battery assembly of FIG. 1 with a portion of the battery cover cut away to illustrate the battery cells that are interconnected by the protection system.
Figure 3:
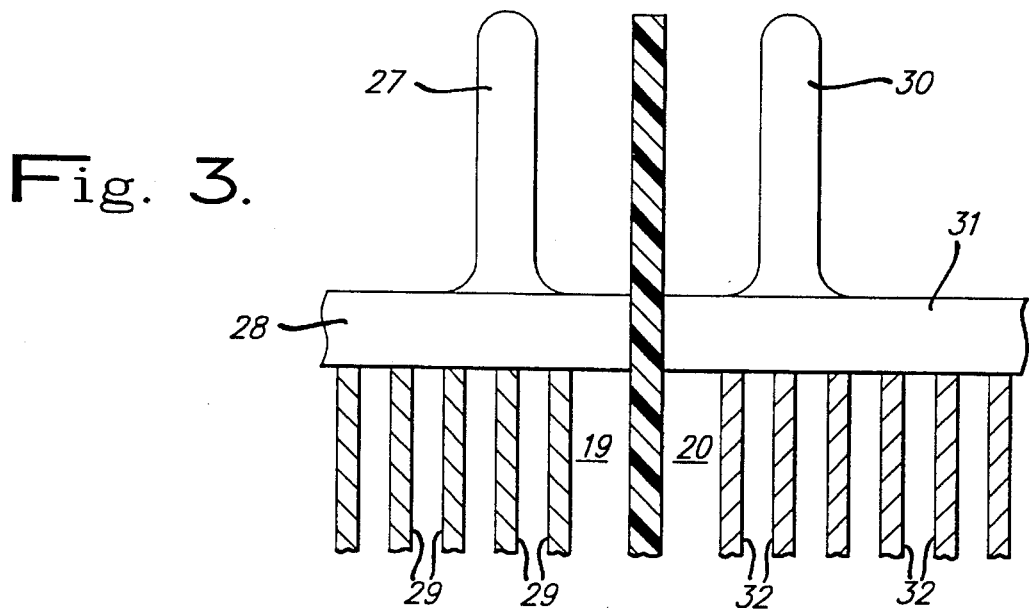
FIG. 3 is an enlarged section view taken along the line 3—3 of FIG. 2.

Considering the protection system in more detail, with reference to FIGS. 1–3, the switching circuit 12 is connected between the second cell and the third cell of the battery, which cells have been given the reference numerals 17 and 16. The cells 16 and 17 are located in compartments 19 and 20, respectively, of the battery housing 22 which has an upper open portion closed by a cover 24. Of the remaining cells, the fourth through sixth cells (not shown) are connected in series with the third cell 16 with the negative strap of the sixth cell being connected to the negative battery terminal 14, providing a four-cell battery portion 25 which produces a voltage of 8 volts. The second cell 17 is connected in series with the first cell (not shown) with the positive strap of the first cell being connected to the positive battery terminal 13, providing a two-cell battery portion 26 which produces a voltage of 4 volts. Cell 16 has a positive terminal 27 that is connected to the conductive strap 28 that interconnects the plates 29 of cell 16 which are located in compartment 19 of the battery housing. Similarly, cell 17 has a negative terminal 30 that is connected to the conductive strap 31 that interconnects the plates 32 of cell 17 which are located in compartment 20 of the battery housing.

While in the exemplary embodiment the battery portion 25 includes four cells and provides a voltage of 8 volts between terminal 27 and the negative battery terminal 14 and the battery portion 26 includes two cells and provides a voltage of 4 volts between the battery positive terminal 13 and terminal 30, those skilled in the art will appreciate that each of the battery portions may comprise fewer or more cells, depending on the chemistries employed, the voltages desired for the battery portions; etc. For example, the switching circuit can be connected between the fourth and fifth cells so that battery portion 25 provides 6 volts and battery portion 26 provides 6 volts. Alternatively, the switching circuit 12 can be connected between the first and second cells, so that battery portion 25 provides 10 volts and battery portion 26 provides 2 volts. Thus, although the switched battery portion generally includes two or more cells, in some applications, the switched battery portion 26 will include only one cell. Therefore, the term "cells" as used in defining the switched battery portion in this specification and in the appended claims is intended to apply to a single cell as well as to a plurality of cells.

Figure 5:
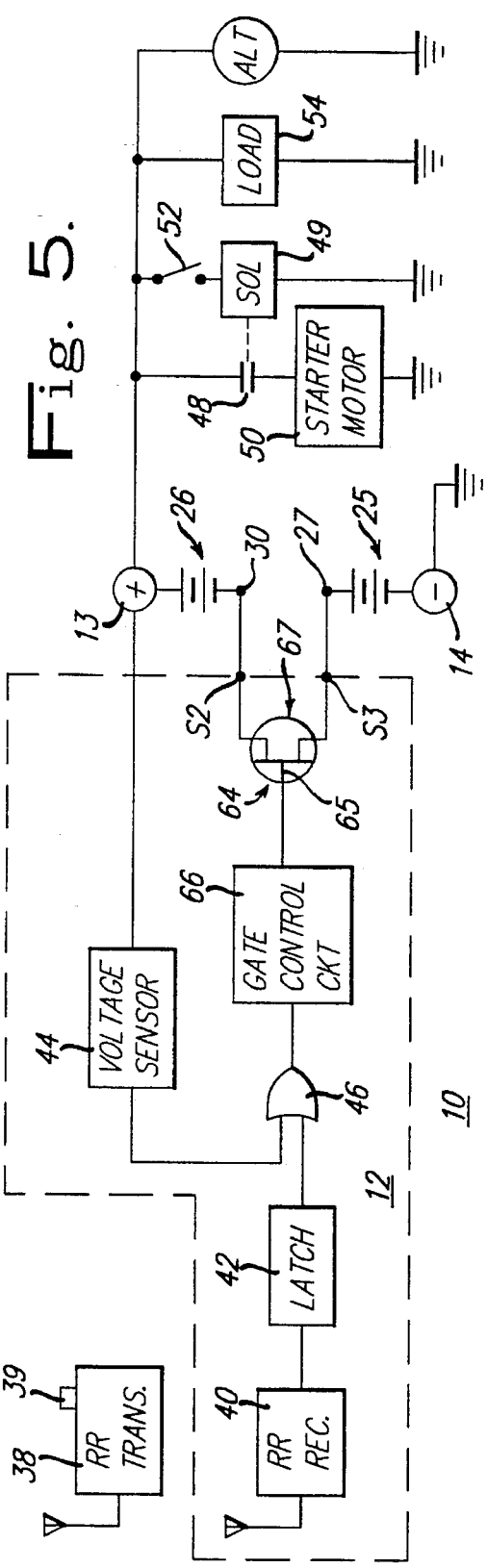
FIG. 5 is a block diagram of a second embodiment of the protection system provided by the present invention.

It is evident that the switching circuit 12 can be retrofitted to existing batteries by breaking the connection between a pair of adjacent cells, such as the second and third cells of the battery, and replacing the battery cover of the existing battery with the cover 24 that includes the switching circuit, and making the appropriate circuit connections to the terminals 27 and 30 of the third and second cells and to the positive and negative battery terminals 13 and 14 in the manner to be described with reference to the schematic circuit diagrams shown in FIGS. 4 and 5.

Referring to FIG. 4, the switching circuit 12 includes a switching device 34 which is controlled by a control circuit, including a driver circuit 36, a signal receiving circuit 40, a toggle latch circuit 42, a voltage sensor circuit 44 and a two-input OR gate 46. The switching circuit 12 is activated in response to a control signal generated by a signal transmitting unit 38.

The switching device 34, which may be a relay or a solid state switch, is connected in circuit with the battery cells between the positive battery terminal 13 and the negative battery terminal 14. In FIG. 4, the switching device 34 is represented by a switch having a pole or terminal S1 connected by a conductor L1 to the positive battery terminal 13, a pole or terminal S2 connected to terminal 30 of the battery portion 26 and a switch arm connected to a terminal S3 that is connected to terminal 27 of the battery portion 25. A further terminal S4 of the switching circuit is connected to the negative or grounded terminal of the battery. Connections are made internally of the switching circuit to terminals S1 and S4 for providing DC power for energizing the circuit elements of the switching circuit 12. The switching device 34 is shown in the theft prevention condition in FIG. 4 where the switch arm contacts pole S1 so that battery portion 25 is connected between the positive and negative battery terminals. When operated to the starting voltage condition, the switch arm is moved out of contact with pole S1 and into contact with pole S2 to connect battery portion 26 in series with battery portion 25 between the positive and negative battery terminals.

The signal transmitting unit 38 is a portable, battery powered unit that is actuated remote from the battery which contains the switching circuit 12. For example, the signal transmitting unit may be carried on a key ring along with the ignition key for the vehicle. The signal transmitting unit includes an RF signal generating circuit that generates an RF control signal when activated. The signal transmitting unit includes a pushbutton 39 that extends through the housing of the signal transmitting unit 38 for activating the signal generating circuit. In accordance with a feature of the invention, the signal transmitting unit 38 includes a power adapter circuit 41 having an associated power lead 43 that is adapted to be plugged into the cigarette lighter of the vehicle for supplying back-up DC power to the signal transmitting unit when needed.

The signal receiving circuit 40 includes an RF signal receiver which responds to the RF control signal generated by the signal transmitting unit 38 to provide a logic level output for changing the state of the latch circuit 42, which provides a logic high level output when set and a logic low level output when reset. The output of the latch circuit 42 is connected to one input of the OR gate 46 for enabling the OR gate whenever the latch is in its set state. The OR gate has its second input connected to the output of the voltage sensor circuit 44 which has its input connected to the positive battery terminal 13. The voltage sensor circuit 44 is a voltage threshold detector circuit that is operable to provide a logic high level output for enabling the OR gate (or maintaining the OR gate enabled) to thereby maintain the switching device in its starting voltage condition when the battery voltage is greater than 13.5 volts, a condition indicative that the battery 11 is being charged by the alternator 53.

The driver circuit 36 is enabled whenever the output of the OR gate is at a logic high level. The driver circuit 36 is operable when enabled to cause the switching device 34 to change state. For a relay type switching device, the driver circuit 36 provides a current signal for operating the relay. For a solid state type switching device, the driver circuit 36 provides a suitable gate drive signal for the device. The components of the switching circuit 12 are connected to the positive and negative terminals 13 and 14 of the battery by conductors 78 and 79.

The battery terminals 13 and 14 are adapted to be connected to the starter circuit which includes normally open contacts 48 of the starter relay or solenoid 49 and the starter motor 50. The starter solenoid 49 is connected in series with the ignition key switch 52 between the positive terminal 13 of the battery 11 and the negative battery terminal 14 or ground for the vehicle electrical circuits of the vehicle. The starter motor 50 is connected to the battery 11 to draw starting current from the battery when the starter relay contacts 48 are closed. An alternator 53 is connected to the battery for providing charging current for the battery when the engine is running. Vehicle accessories such as the lights, the radio, and the like as well as electronic components, such as the vehicle computer, also are connected to the battery and are represented by the load 54. These electrical and electronic components operate at a lower voltage than the starter motor and can function as required when energized by the lower level theft prevention voltage that is provided by the battery portion 25.

The switching circuit 12 includes an alarm generating circuit 55 for providing a momentary audible signal for indicating that the switching circuit 12 is in the theft protection condition. This signal alerts an authorized operator to operate the switching circuit 12 to the starting voltage condition. The alarm generating circuit 55 includes a current level detecting circuit 56 connected for sensing the current flowing in conductor L1 and for generating an audible alarm when a current in excess of 5 amperes flows in conductor L1, as would be the case if the ignition switch were operated closed while the switching device is in the theft prevention condition. It is pointed that other alarm mechanisms may be employed, such as providing a reminder signal in response to the opening of the car door, in response to insertion Of the ignition key, or in response to other conditions or activities associated with: the start-up of the engine of the vehicle.

The switching circuit 12 further includes a discharge control circuit 58 associated with battery portion 26 for providing a controlled discharge of the battery portion 26 coordinated with discharge of the battery portion 25 when the switching circuit is in the theft protection mode. The discharge control circuit 58 includes a MOSFET device 59 and a resistor 60 connected in the source to drain circuit of the field-effect device 59. The series connected device 59 and resistor 60 are connected in parallel with battery portion 26. The gate of the device 59 is connected to an analog voltage sensing circuit 61 that is connected in parallel with battery portion 25 for sensing the voltage of battery portion 25 which energizes the load. As the voltage being provided by battery portion 25 decreases due to the load 54, the sensing circuit 61 causes a proportional change in the conductivity of the field-effect device 59 to draw current from the battery portion 26 in a controlled manner, to cause the charge level of battery portion 26 to decrease in correspondence with a change in the charge level of battery portion 25 when the switching circuit is in the theft prevention mode and battery portion 26 is not connected in the battery circuit between the battery terminals 13 and 14.

Referring to FIG. 5, in accordance with a further embodiment, the switching circuit includes a switching device that is embodied as a field-effect transistor 64, such as a solid state high power MOSFET. The field-effect transistor 64 has its gate 65 connected to the output of a driver circuit 66, and its source-to-drain circuit 67 connected in series with the cells 16 and 17 between the positive and negative terminals 13 and 14 of the battery 11. The duty cycle of the gate control circuit 66 is variable to vary the "on-time" of the field effect transistor 64 to thereby vary the voltage that is provided between the positive and negative battery terminals 13 and 14. In the exemplary embodiment, the duty cycle of the gate control circuit 66 is selectable under the control of a signal provided by the RF transmitter/receiver pair or the voltage sensor circuit 44 between a first value in which a first conductivity is established for the field-effect transistor 64 to provide a voltage of about 5 to 8 volts for the theft protection condition and a second value in which a second conductivity is established for the field-effect transistor 64 to provide the full 12 volts for the starting voltage condition. The duty cycle can be adjusted to provide any voltage ratio for the theft protection and the starting voltage conditions.

Figure 6:
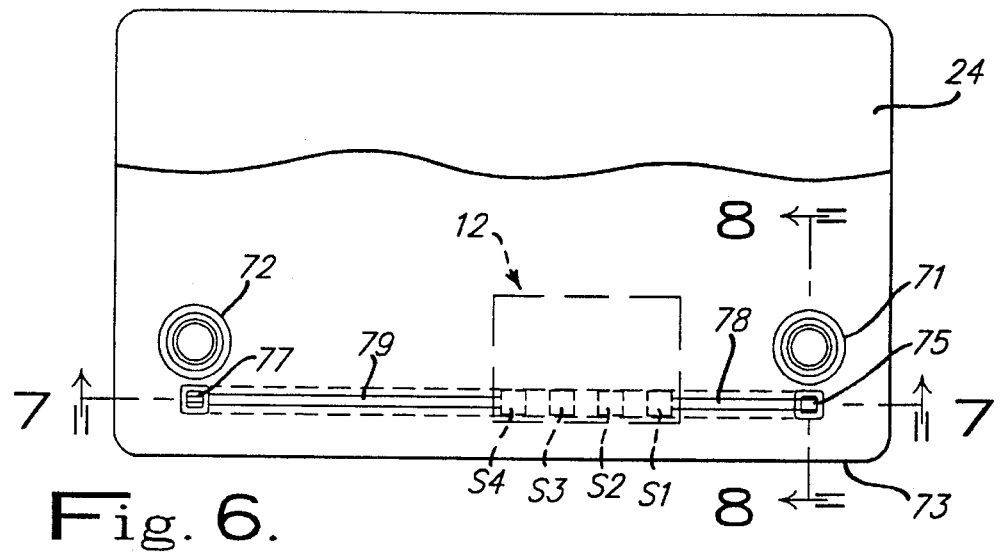
FIG. 6 is a plan view of the cover of the battery assembly shown in FIG. 1, illustrating the protection system mounted on the cover.
Figure 7:
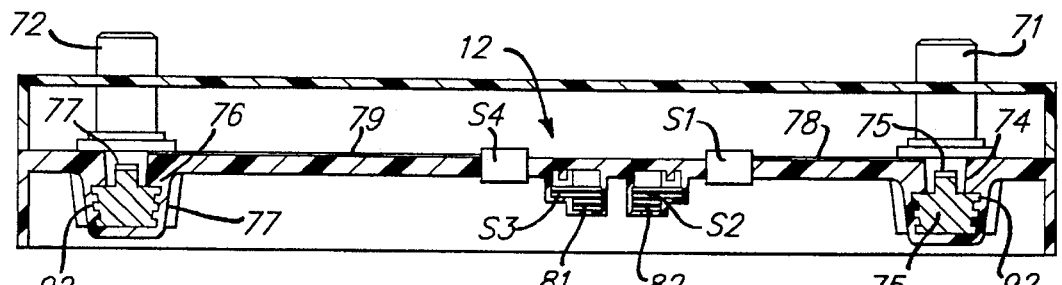
FIG. 7 is a section view taken along line 7—7 of FIG. 6.
Figures 8, 10:
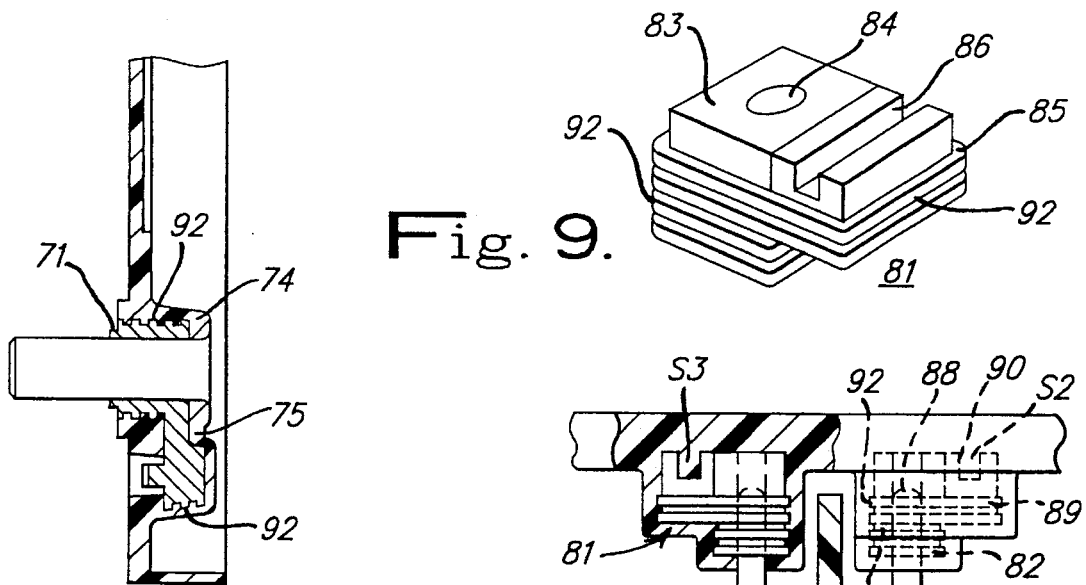
FIG. 8 is a section view taken along line 8—8 of FIG. 6.
FIG. 10 is an enlarged, fragmentary view, partially in section, illustrating the manner in which a pair of adjacent cells of the battery are interconnected by the switching circuit.

Referring to FIGS. 6–8, which illustrate the cover 24 of the battery housing prior to its assembly with the battery housing, a pair of terminal connectors 71 and 72 are molded into the cover near one edge 73 thereof. The terminal connector 71 includes a cylindrical main body portion 74 shown in FIG. 8, having an opening therethrough to receive the positive battery terminal 13 in an electrical conducting relationship when the cover is assembled on the battery housing and an offset connector portion 75. Terminal connector 71 is identical in size and shape to terminal connector 71 and includes a cylindrical main body portion 76 having an opening therethrough to receive the negative battery terminal 14 in an electrical conducting relationship and an offset connector portion 77. In the exemplary embodiment, the connecting terminals are made of lead or a lead alloy.

The switching circuit 12 is mounted in the cover 24 near the edge 73 of the cover and at a location to overlie the terminals 27 and 30 of the cells 17 and 18 when the cover 24 is in place on the battery housing. The terminals S1, S2, S3 and S4 of the switching circuit 12 are formed of copper or another highly conductive material and each of the terminals is rectangular in cross-section. A conductive bus bar 78 connects terminal S1 of the switching circuit 12 to terminal connector 71 which is connected to positive battery terminal 13. Bus bar 78 has one end connected to the Connecting portion 75 of terminal connector 71 by a burn operation and its other end connected to terminal S1. Another conductive bus bar 79 connects terminal S4 of the switching circuit 12 to terminal connector 72 which is connected to the negative battery terminal 14, which serves as electrical ground for the electrical circuits of the vehicle. Bus bar 79 has one end connected to the connecting portion 77 of terminal connector 72 by a burn operation and its other end connected to terminal S1. The ends of the conductive bus bars are electrically and mechanically connected to the terminals S1 and S4 in a suitable manner such as by soldering. The bus bars 78 and 79 are rectangular in cross-section and are made from a highly conductive material, such as copper, to minimize ohmic losses within the battery to provide maximum voltaic potential to the load. The bus bars are molded into the cover which is made by injection molding for example. The manner in which the conductive bus bars 78 and 79 are molded into the cover and connected to the terminal connectors 71 and 72 can be done in a manner similar to that disclosed in U.S. Pat. No. 5,002,840 issued to Alan J. Klebenow et al.

Referring to FIGS. 7, 9 and 10, the terminals S2 and S3 of the switching circuit 12 are connected to the terminals 27 and 30 of the cells 17 and 18 by a pair of intercell terminal connectors 81 and 82 which are identical in size and shape. As shown in FIG. 9, terminal connector 81 has a terminal receiving portion 83 which is generally rectangular in cross-section and has a through bore 84 for receiving the terminal 27. Terminal connector 81 has an offset terminal connecting portion 85 having a slot 86 for receiving the terminal S3. Similarly, terminal connector 82 has a terminal receiving portion 87 which is generally rectangular in cross-section and has a through bore 88 for receiving the terminal 30. Terminal connector 82 has an offset terminal connecting portion 89 having a slot 90 for receiving the terminal S2. The cover 24 is an integral unit molded of a plastic material and having the terminal connectors and the bus bars molded into the cover. Each of the terminal connectors has peripheral rib portions 92 around which plastic material flows during the molding operation to secure the terminal connectors to the cover. An important advantage is that existing manufacturing techniques and equipment can be modified to produce the protection system according to the present invention.

Referring again to FIG. 4, for the purpose of illustrating the operation of the protection system 10, it is assumed initially that the switching device 32 is operated to the theft protection mode as shown in FIG. 4 to connect battery portion 25 between the battery terminals 13 and 14 and that an authorized operator is about to start the engine of the vehicle. Prior to turning the ignition key to start the engine of the vehicle, the operator depresses the pushbutton 39 on the portable transmitter unit 38, causing the RF signal generating circuit to generate a control signal. The signal receiving circuit 40 is responsive to the control signal to provide a signal which sets the latch circuit 42 so that its output becomes a logic high level. When the output of the latch circuit 42 becomes a logic high level output, the driver circuit 36 is enabled to operate the switching device to the starting voltage condition to connect terminal 27 of battery portion 25 to terminal 30 of battery portion 26 so that battery portion 26 is connected in series with battery portion 25, providing the full 12 volt battery voltage between the battery terminals 13 and 14.

Accordingly, when the operator operates the ignition key 52 through the "on" position to the start position, the starter relay 49 is operated to close the contacts 48 to connect the starter motor 50 to the vehicle battery 11, enabling the vehicle to be started in the normal manner. However, if for any reason the operator fails to enable the switching Circuit 12 before attempting to start the vehicle engine, or if an unauthorized person is attempting to start the vehicle, then when ignition switch is closed (or even if the ignition switch is jumped), the starter solenoid 49 is operated to close the starter contacts 48. When contacts 48 close, the starter motor 50 is connected to the vehicle battery, but the voltage being provided by the battery 11 is insufficient to operate the starter motor 50. Also, the alarm sensing circuit 55 detects current flow in excess of 5 amps in conductor L1 and provides a momentary audible alarm to remind the operator that the switching circuit is still in the protection mode.

After the engine has been stopped, the operator depresses the pushbutton 39 to generate a further control signal for causing the latch circuit 42 to be reset and causing the system to be armed.

If the vehicle engine is running, the output of the voltage sensing circuit 44 is at a logic high level because the alternator 53 is supplying charging current to the battery and that the terminal voltage of the battery is 13.5 volts or greater. If the pushbutton 39 is depressed under such condition, the OR gate is maintained enabled and the driver circuit 34 maintains the switching device in the starting voltage condition.

The operation of the circuit shown in FIG. 5 is similar except that both battery portions 25 and 26 are connected in series between the battery terminals 13 and 14 by the field-effect transistor 64. However, in the theft protection mode, the duty cycle limits the battery terminal voltage to about 8 volts and the battery terminal voltage is increased to about 12 volts when the gate drive circuit is enabled by a signal provided by the transmitter/receiver pair or the voltage sensing circuit. The switching circuit shown in FIG. 5 includes the features, such as the alarm circuit 55 and the battery back-up for the transmitter unit 38, of the switching circuit 12 shown in FIG. 4.

Thus, it can be seen that the present invention provides a protection system for vehicles which prevents starting of the vehicle engine if the system is not switched from a low to a high voltage condition prior to attempting to start the engine. The protection system includes a switching device which connects a first plurality of battery cells in series with a second plurality of battery cells to increase the voltage to a level that is sufficient for starting the engine. The switching device is operated by a portable signal transmitting unit which is remotely actuatable. In the exemplary embodiment, the protection system is mounted within the vehicle battery which is locked within the engine compartment of the vehicle where it is unaccessible.

Although the protection system has been described with reference to a preferred embodiment, it is apparent that variations in the details of the embodiment described may be made without departing from the spirit and scope of the invention as defined by the appended claims. For example, although the system is mounted within the battery housing, the circuit may be mounted in proximity of the starter motor or the starter circuit or may be mounted adjacent to but exterior of the battery.

We claim:

1. A protection system for a motor vehicle having a starting circuit including a starter motor for starting the engine of the vehicle, said system comprising:

battery means having first and second battery terminals, said battery means being adapted to be connected to said starting circuit to permit said starter motor to be energized by said battery means, said battery means including a first plurality of cells electrically interconnected to form a first battery portion which provides a first voltage, and a second plurality of cells electrically interconnected to form a second battery portion which provides a second voltage;

and circuit means connecting said first and second battery portions between said first and second battery terminals, said circuit means including switching means connected between said first battery portion and said second battery portion and operable between a first condition in which said switching means connects only said first battery portion between said first and second battery terminals whereby the voltage at said first and second battery terminals corresponds to said first voltage, and a second condition in which said switching means connects said second battery portion in series with said first battery portion between said battery terminals whereby the voltage provided at said first and second terminals corresponds to the sum of said first and second voltages, said circuit means including control means including signal receiving means coupled to said switching means and a signal transmitting device manually operable by an operator of the vehicle at a location remote from the location of said signal receiving means for generating control signals for enabling said signal receiving means to operate said switching means between said first and second conditions, said first voltage being insufficient to operate said starter motor to start said engine and said voltage equal to said sum of said first and second voltages being sufficient to operate said starter motor to start said engine.

2. The system according to claim 1, wherein said transmitting device includes a signal generating circuit and power circuit means for energizing said signal generating circuit, said power circuit means including a battery and a power adapter circuit including a power lead adapted to be connected to a source of DC power of the vehicle.

3. The system according to claim 1, wherein said switching means includes a controllable switching device which connects said first and second battery portions in series between said battery terminals, said control means causing said controllable switching device to have a first state of conductivity when in said first condition and having a second state of conductivity when operated to said second condition.

4. The system according to claim 1, wherein said control means includes voltage sensing means for sensing the voltage at said first battery terminal and for maintaining said switching means in said second condition when the voltage at said first terminal is greater than a setpoint value.

5. The system according to claim 1, wherein said battery means includes a cover and said switching means is mounted in said cover, and wherein said circuit mean includes a first terminal connector for connecting a terminal of said first battery portion to a first terminal of said switching means, a second terminal connector for connecting a terminal of said second battery portion to a second terminal of said switching means, and first and second electrical conductors mounted in said battery cover, said first electrical conductor connecting a third terminal of said switching means to said first battery terminal, and said second electrical conductor connecting a fourth terminal of said switching means to said second battery terminal.

6. The system according to claim 1, wherein said battery means includes a housing and said switching means is contained within said battery housing.

7. The system according to claim 1, including alarm generating means operable to provide an alarm indication when an attempt is made to start the vehicle while said switching means is in said first condition.

8. The system according to claim 1, including voltage sensing means for controlling said switching means to prevent the disconnection of said second battery portion from said first battery portion when said battery means voltage is at least a predetermined value.

9. The system according to claim 1, wherein said circuit means includes discharge control means associated with said second battery portion and including voltage sensing means for sensing the voltage being provided by said first battery portion and means responsive to said voltage sensing means for providing controlled discharge of said second battery portion at a rate corresponding to discharge of said first battery portion.

10. The system according to claim 1, wherein said first battery portion has a first terminal connected to said first battery terminal and a second terminal, and said second battery portion has a third terminal connected to said second battery terminal and a fourth terminal, said switching means connecting said second terminal to said second battery terminal to thereby connect said first battery portion between said first and second battery terminals, and said switching means being operable manually by an operator of the vehicle to disconnect said second terminal from said second battery terminal and to connect said second terminal to said fourth terminal to thereby connect said first and second battery portions in series between said first and second battery terminals.

11. The combination comprising: a battery for use with a motor vehicle, said battery being adapted to be connected to a starter motor of the vehicle for energizing the starter motor to start the engine of the vehicle, said battery having first and second battery terminals and including a first plurality of battery cells forming a first battery portion and a second plurality of battery cells forming a second battery portion, said first plurality of battery cells being electrically interconnected to provide a first voltage and said second plurality of battery cells being electrically interconnected to provide a second voltage, switching means connected between said first and second battery portions, and control means operable by an operator of the vehicle for generating a control signal for operating said switching means between a first condition in which said switching means connects only said first battery portion between said first and second battery terminals whereby the voltage between said first and second battery terminals corresponds to said first voltage, and a second condition in which said switching means connects said second battery portion in series with said first battery portion between said battery terminals to cause a voltage corresponding to the sum of said first and second voltages to be provided between said first and second battery terminals, said first voltage being insufficient to operate said starter motor to start said engine and said voltage equal to the sum of said first and second voltages being sufficient to operate said starter motor to start said engine.

12. The combination according to claim 11, wherein said switching means is operable to connect said second battery portion in series with said first battery portion between said first and second battery terminals.

\* \* \* \* \*